United States Patent [19]

Eto et al.

[11] 4,329,771
[45] May 18, 1982

[54] CONTACT DETECTING APPARATUS

[75] Inventors: Kunihiko Eto, Toyota; Shiro Seki, Kariya; Kaoru Owa, Aichi, all of Japan

[73] Assignee: Toyoda Koki Kabushiki Kaisha, Kariya, Japan

[21] Appl. No.: 160,542

[22] Filed: Jun. 18, 1980

[30] Foreign Application Priority Data

Jun. 29, 1979 [JP] Japan .................................. 54/83328

[51] Int. Cl.³ ........................................... B23Q 3/155
[52] U.S. Cl. .......................................... 29/568; 408/6; 408/8; 408/11; 408/35; 409/134
[58] Field of Search ......................... 29/568; 409/134; 408/35, 710, 8, 10, 11, 6, 13

[56] References Cited

U.S. PATENT DOCUMENTS

| | | | |
|---|---|---|---|
| 3,133,457 | 5/1964 | Martens | 408/6 |
| 3,636,814 | 1/1972 | Esch | 408/8 X |
| 4,203,691 | 5/1980 | Nishimura | 408/8 |

FOREIGN PATENT DOCUMENTS

| | | | |
|---|---|---|---|
| 54-35490 | 3/1979 | Japan | 408/6 |
| 2003407 | 3/1979 | United Kingdom | 408/6 |
| 520227 | 8/1976 | U.S.S.R. | 408/6 |

*Primary Examiner*—William R. Briggs
*Attorney, Agent, or Firm*—Oblon, Fisher, Spivak, McClelland & Maier

[57] ABSTRACT

A contact detecting apparatus for detecting the contact of a workpiece and a tool which comprises a coil mounted on the periphery of a spindle head and connected to an AC power source for generating an induced current in a first looped secondary circuit formed by the workpiece, a work table, a machine bed, a column, a spindle head, a tool spindle and a tool in the tool spindle when the workpiece and the tool are moved relatively into contact with each other, and a second looped secondary circuit formed by a tool change device, the tool, the tool spindle and the spindle head when a tool change operation is performed. A detector is connected between the AC power source and the coil for detecting a change in an electrical signal caused by contact between the workpiece and the tool or contact between the tool change device and the tool to output a contact detecting signal. Another detector is provided to detect that a contact detecting signal is not generated, even if a tool change operation has been performed.

4 Claims, 3 Drawing Figures

CONTACT DETECTING APPARATUS

BACKGROUND OF THE INVENTION

1. Field of the Invention

The present invention relates to a contact detecting apparatus for detecting the contacting of a tool with a workpiece when the tool and the workpiece are moved relatively with respect to one another.

2. Description of the Prior Art

A prior contact detecting apparatus contains a coil mounted on the end of a spindle head and connected to an AC power source. When a tool is moved into contact with a workpiece, the output signal of the coil is caused to change, since a looped circuit connecting a spindle, the tool, the workpiece and a bed is completed. Therefore, the change of the output is used to detect that the tool has made contact with a workpiece.

In a conventional machine tool having this feature, a contact detecting signal from the contact detecting apparatus is used to cause the machine tool to change its feed rate from a rapid free rate to a machining feed rate and to measure the distance between the reference position and the workpiece. However, when the contact detecting apparatus fails to indicate the contact for some reasons, such as malfunction of the contact detecting apparatus or breaking down of the wire of the coil, damage may be caused not only to the workpiece but also to the tool because the feed rate of the machine tool is not altered to the machining feed rate and/or the tool is not stopped even after making contact with the workpiece.

SUMMARY OF THE INVENTION

It is therefore an object of the present invention to provide a new and improved contact detecting apparatus which can avoid causing damage to a tool or a workpiece even in the case of malfunction of the contact detecting apparatus.

Another object of the present invention is to provide a new and improved contact detecting apparatus of the character set forth above, which is operated each time a tool change operation is performed and which is capable of detecting a malfunction at the tool change operation.

Briefly, according to the present invention, these and other objects are achieved by providing a contact detecting apparatus in a machine tool including a machine bed, an upstanding column, a work table mounted on the machine bed for mounting thereon a workpiece to be machined, a spindle head slidably mounted on the column, a tool spindle rotatably supported in the spindle head, a tool storage magazine for storing a plurality of tools, tool change means for changing tools between the tool spindle and the tool storage magazine, numerical control means for effecting relative movement between the work table and the tool spindle and for generating an auxiliary function signal, and tool change control means for causing the tool change means to perform a tool change operation in response to the auxiliary function signal and for applying a tool change completion signal to the numerical control means upon completion of the tool change operation, as mentioned below. A coil is mounted on the spindle head and connected to an AC power source for generating an induced current in a first looped secondary circuit including the workpiece, work table, machine bed, column, spindle head, tool spindle and tool in the tool spindle when the workpiece and the tool in the tool spindle are moved relatively into contact with each other, and in a second looped secondary circuit including the tool change means, tool in the tool spindle, tool spindle and spindle head when a tool change operation is performed by the tool change means. Means for detecting a change in an electric signal caused by the contact between the workpiece and the tool in the tool spindle and the contact between the tool change means and the tool in the tool spindle is connected between the AC power source and the coil to output a contact detecting signal. Means is provided for detecting that a contact detecting signal is not generated, even if a tool change operation has been performed.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which like reference numerals or characters designate the same or similar parts throughout the figures thereof and wherein.

DETAILED DESCRIPTION OF A PREFERRED EMBODIMENT

Figure 1:
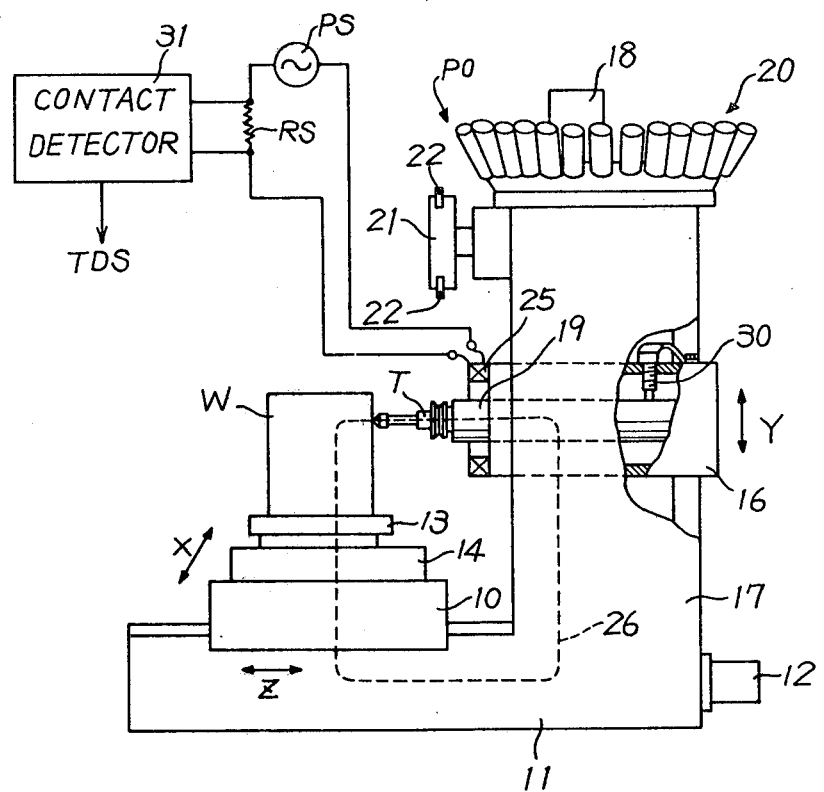
FIG. 1 is a schematic construction of a machine tool provided with a contact detecting apparatus according to the present invention.

Referring now to FIG. 1, a machine tool comprises a machine bed 11 on which a table 10 is guided for sliding movement in a Z-axis direction. A workpiece W is mounted on a rotary table 13 rotatably and indexably carried on a work table 14, which is guided on the table 10 for sliding movement in an X-axis direction perpendicular to the drawing sheet.

A spindle head 16 is guided on an upstanding column 17 of the machine tool for sliding movement in a Y-axis direction. A tool spindle 19 is rotatably received in the spindle head 16 and supports a tool T for a machining operation. Servomotors 12 and 18 which are mounted respectively on the rear end of the bed 11 and on the top of the column 17 serve to move respectively the table 10 and the spindle head 16 and a servomotor 15 serves to move the work table 14.

Figure 2:
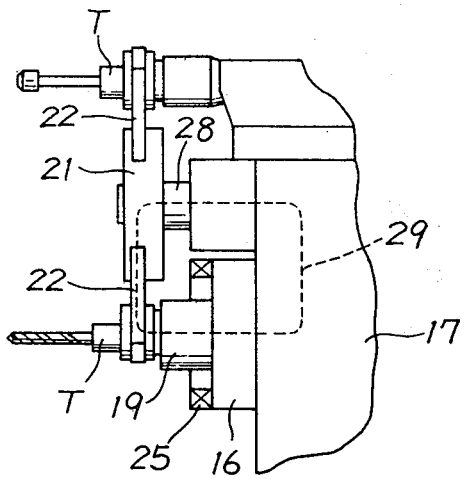
FIG. 2 is an enlarged fragmentary view showing the contact of a tool in a spindle with the gripper of a tool change arm.

On the top of the column 17, there is rotatably and indexably mounted a tool storage magazine 20, in which a plurality of cutting tools and one contact detecting tool are stored at equiangular intervals. The cutting tools and the contact detecting tool are removably inserted respectively into a plurality of tool sockets, which are carried by the tool storage magazine 20 for pivotal movement. Any tool socket receiving a desired one of the cutting tools and the contact detecting tool is indexable by the rotation of the tool storage magazine 20 to a tool change position PO and thereat is downwardly pivotable to the horizontal angular position where it is positioned in parallel relationship with the tool spindle 19, as shown in FIG. 2.

The column 17 also mounts at its front portion an automatic tool changer, which rotatably and axially slidably supports a shaft 28. The shaft 28 carries at its one end a tool change arm 21, which pivotably carries a pair of tool grippers 22 at its opposite ends for tool gripping. As well known in the art, the tool change arm 21 serves to simultaneously exchange tools between the tool socket indexed to the tool change position PO of the tool storage magazine 20 and the tool spindle 19 located at its predetermined upper position.

A ring-shaped coil 25 is mounted on the front end of the spindle head 16 and is connected to an AC power source PS for generating a magnetic flux around the tool spindle 19. Accordingly, when the tool T in the tool spindle 19 is moved into contact with the workpiece W, a looped secondary circuit 26 is completed through the workpiece W, the rotary table 13, the work table 14, the table 10, the bed 11, the column 17, the spindle head 16 and the tool spindle 19, whereby a current is induced therein so as to change the output across a register RS which is connected in series to the AC power source PS and the coil 25. When the tool T in the tool spindle 19 is grasped by the tool gripper 22 of the tool change arm 21 during an automatic tool changing operation, a looped secondary circuit 29 is also completed through the tool T, the tool gripper 22, the tool change arm 21, the shaft 28, the column 17, the spindle head 16 and the tool spindle 19, as shown in FIG. 2, whereby a current is induced therein so as to change the output across the register RS. A conductive brush 30 is provided on the rear end of the spindle head 16 and is held in contact with the spindle 19 so as to be conductive therewith. Therefore, the conductive brush 30 serves to bypass an electric resistance of bearings supporting the tool spindle 19 to decrease and stabilize a resistance in the looped secondary circuits 26 and 29 irrespective of rotation of the tool spindle 19.

A contact detecting circuit 31 is connected to the register RS and serves to output a contact detecting signal TDS when the tool makes contact with the workpiece W or the gripper 22.

Figure 3:
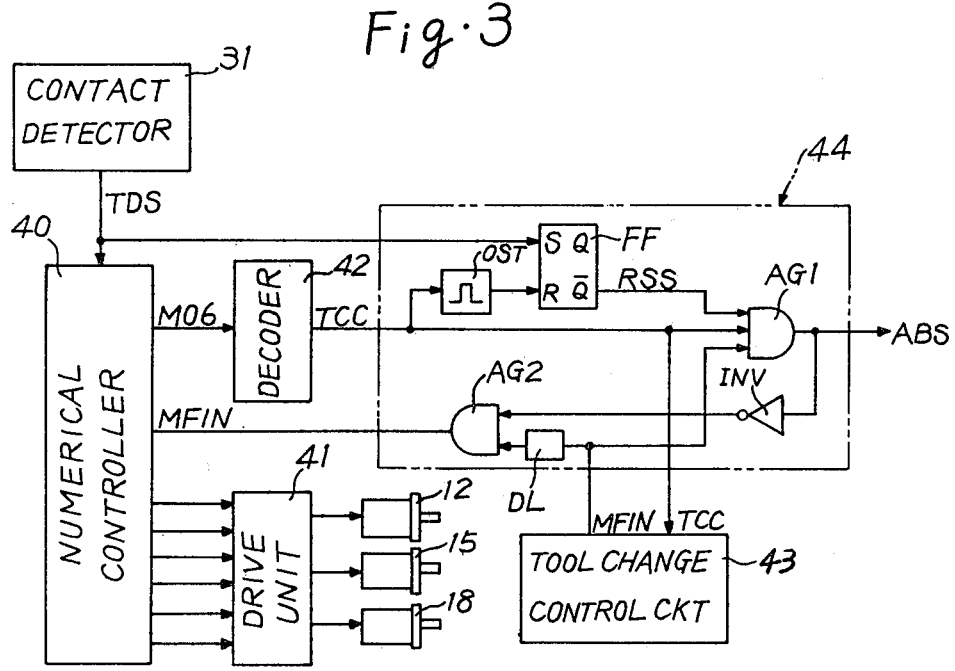
FIG. 3 is a circuit diagram of an electric circuit for detecting abnormality of the contact detecting apparatus at a tool change operation.

Referring to FIG. 3, there is shown a numerical controller 40 of a conventional construction, which distributes feed pulses for controlling the relative movement between the tool T and the workpiece W and outputs auxiliary function signals such as an M-code signal MO6 for an automatic tool changing operation. Servomotors 12, 15 and 18 are connected to the numerical controller 40 through a drive unit 41 and are responsive to the feed pulses from the numerical controller 40 to control movements of the table 10, the work table 14, and the spindle head 16, respectively. A decoder 42 is coupled to the numerical controller 40 and applies a tool change command signal TCC to a tool change control circuit 43 when receiving the M-code signal MO6 from the numerical controller 40. Upon receipt of the signal TCC, the tool change control circuit 43 operates the tool change arm 21 to perform a tool change operation. Upon completion of the automatic tool changing operation, the tool change control circuit 43 operates to output a signal MFIN to the numerical controller 40 so as to cause the same to perform a next predetermined operation.

A protective circuit 44 comprises a one-shot circuit OST, a flip-flop FF, two AND gates AG1 and AG2, an inverter INV and a delay circuit DL. The one-shot circuit OST is connected between the decoder 42 and a reset input terminal R of the flip-flop FF and generates a reset signal for a constant interval when receiving the tool change command signal TCC from the decoder 42 to reset the flip-flop FF. When reset, the flip-flop FF outputs a reset signal RSS from its reset output terminal $\overline{Q}$. The flip-flop FF is connected at its set input terminal S to the contact detecting circuit 31 so as to be set when receiving the contact detecting signal TDS therefrom. The AND gate AG1 is connected at its input terminals to the reset output terminal $\overline{Q}$ of the flip-flop FF to output an abnormal signal ABS only when receiving all of the signals RSS, TCC and MFIN therefrom. When the abnormal signal ABS is output, a warning lamp is illuminated to inform an operator of the occurrence of an abnormality. The AND gate AG2 is connected to its input terminals to the AND gate AG1 through the inverter INV and to the tool change control circuit 43 through the delay circuit DL to prevent the signal MFIN from being applied to the numerical controller 40 when the abnormal signal ABS is output.

Accordingly, when the contact detecting signal TDS is not output from the contact detecting circuit 31 during an automatic tool changing operation, the flip-flop FF remains reset even after completion of the automatic tool changing operation. Therefore, the abnormal signal ABS is output after the signal MFIN is generated from the tool change control circuit 43 and the operator is informed of the abnormality by means of the warning lamp. The AND gate AG2 is closed by the output of the abnormal signal ABS so that the signal MFIN is prevented from being applied to the numerical controller 40.

Therefore, if the contact detecting circuit 31 fails to output the contact detecting signal TDS for some reasons, the numerical controller 40 is prevented from doing further operations and this avoids damaging of the tool or the workpiece.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a machine tool including a machine bed, an upstanding column, a work table mounted on said machine bed for mounting thereon a workpiece to be machined, a spindle head slidably mounted on said column, a tool spindle rotatably supported in said spindle head, a tool storage magazine for storing a plurality of tools, tool change means for changing tools between said tool spindle and said tool storage magazine, numerical control means for effecting relative movement between said work table and said tool spindle and for generating an auxiliary function signal, and tool change control means for causing said tool change means to perform a tool change operation in response to said auxiliary function signal and for applying a tool change completion signal to said numerical control means upon completion of the tool change operation, a contact detecting apparatus comprising:

an AC power source;

a coil mounted on said spindle head and connected to said AC power source for generating an induced current in a first looped secondary circuit including the workpiece, work table, machine bed, column, spindle head, tool spindle and tool in said tool spindle when said workpiece an said tool in said tool spindle are moved relatively into contact with each other, and in a second looped secondary circuit including the tool change means, tool in said tool spindle, tool spindle and spindle head when a tool change operation is performed by said tool change means;

first means connected between said AC power source and said coil for detecting a change in an electric signal caused by the contact between said workpiece and said tool in said tool spindle and the contact between said tool change means and said tool in said tool spindle to output a contact detecting signal; and second means for detecting that a contact detecting signal is not generated, even if a tool change operation has been performed.

2. A contact detecting apparatus as set forth in claim 1, wherein said second detecting means comprises:

a flip-flop connected to receive said contact detecting signal to be set thereby and said auxiliary function signal to be reset thereby;

first gate means connected to said flip-flop, said numerical control means and said tool change control means for generating an abnormal signal when said flip-flop remains reset when said auxiliary function signal and said tool change completion signal are generated; and second gate means responsive to said abnormal signal for prohibiting said tool change completion signal from being applied to said numerical control means.

3. A contact detecting apparatus as claimed in claim 2, further comprising a one-shot circuit connected between said numerical control means and the reset input terminal of said flip-flop.

4. A contact detecting apparatus as claimed in claim 2, wherein said second gate means is connected to said first gate means through an inverter and to said tool change control means through a delay circuit.

* * * * *